US012682870B2

(12) United States Patent
Hart et al.

(10) Patent No.: US 12,682,870 B2
(45) Date of Patent: Jul. 14, 2026

(54) SYSTEMS AND METHODS FOR IMPROVING OPERATING CHARACTERISTICS OF DISPLAYS

(71) Applicant: Snap Inc., Santa Monica, CA (US)

(72) Inventors: Stephen John Hart, San Juan Capistrano, CA (US); Rock Edward Kent, Estacada, OR (US); Howard V. Goetz, Tigard, OR (US); James L. Sanford, Wappingers Falls, NY (US); Nicholas W. Melena, Phoenix, AZ (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/187,684

(22) Filed: Apr. 23, 2025

(65) Prior Publication Data

US 2025/0299649 A1 Sep. 25, 2025

Related U.S. Application Data

(63) Continuation of application No. 18/529,566, filed on Dec. 5, 2023, now Pat. No. 12,322,360, which is a continuation of application No. 17/821,133, filed on Aug. 19, 2022, now Pat. No. 11,893,966, which is a continuation of application No. 17/057,796, filed as application No. PCT/US2019/034004 on May 24, 2019, now Pat. No. 11,455,975.

(60) Provisional application No. 62/676,148, filed on May 24, 2018.

(51) Int. Cl.
*G09G 5/395* (2006.01)
*G09G 3/36* (2006.01)

(52) U.S. Cl.
CPC ............... *G09G 5/395* (2013.01); *G09G 3/36* (2013.01); *G09G 2300/0478* (2013.01)

(58) Field of Classification Search
CPC .......... G09G 5/395; G09G 3/36; G09G 3/002; G09G 3/2025; G09G 3/3648; G09G 3/3696; G09G 2300/0478; G09G 2320/02; G09G 2230/00; G02F 2203/50
See application file for complete search history.

(56) References Cited

U.S. PATENT DOCUMENTS

| | | | |
|---|---|---|---|
| 6,930,692 | B1 | 8/2005 | Coker et al. |
| 2004/0046726 | A1 | 3/2004 | Sako et al. |
| 2005/0258830 | A1 | 11/2005 | Deimling |
| 2007/0018919 | A1 | 1/2007 | Zavracky et al. |

(Continued)

FOREIGN PATENT DOCUMENTS

| | | | |
|---|---|---|---|
| CN | 101495948 | | 7/2009 |
| CN | 112602146 | A | 4/2021 |

(Continued)

OTHER PUBLICATIONS

"U.S. Appl. No. 18/529,566, Corrected Notice of Allowability mailed Apr. 4, 2025", 2 pgs.

(Continued)

*Primary Examiner* — Brent D Castiaux
(74) *Attorney, Agent, or Firm* — Schwegman Lundberg & Woessner, P.A.

(57) ABSTRACT

Systems and methods for improving operating characteristics of displays such as liquid crystal on silicon displays.

20 Claims, 11 Drawing Sheets

(56) References Cited

U.S. PATENT DOCUMENTS

| | | | | |
|---|---|---|---|---|
| 2015/0009203 | A1* | 1/2015 | Fulton | G09G 5/18 345/213 |
| 2020/0135128 | A1* | 4/2020 | Ferguson | G09G 3/3696 |
| 2021/0201856 | A1 | 7/2021 | Hart et al. | |
| 2023/0186874 | A1 | 6/2023 | Hart et al. | |
| 2024/0194167 | A1 | 6/2024 | Hart et al. | |

FOREIGN PATENT DOCUMENTS

| | | | |
|---|---|---|---|
| CN | 118506749 | A | 8/2024 |
| EP | 0855693 | | 7/1998 |
| EP | 1396838 | | 3/2004 |
| EP | 3803839 | A1 | 4/2021 |
| JP | 2021525387 | A | 9/2021 |
| JP | 2024160278 | A | 11/2024 |
| KR | 100515468 | | 9/2005 |
| KR | 20210027272 | A | 3/2021 |
| KR | 102747508 | B1 | 12/2024 |
| TW | 202004717 | A | 1/2020 |
| WO | 02103667 | | 12/2002 |
| WO | WO-2019227047 | A1 | 11/2019 |

OTHER PUBLICATIONS

"U.S. Appl. No. 18/529,566, Examiner Interview Summary mailed Dec. 26, 2024", 2 pgs.

"U.S. Appl. No. 18/529,566, Non Final Office Action mailed Oct. 8, 2024", 15 pgs.

"U.S. Appl. No. 18/529,566, Notice of Allowance mailed Jan. 30, 2025", 16 pgs.

"U.S. Appl. No. 18/529,566, Preliminary Amendment filed Dec. 6, 2023", 4 pgs.

"U.S. Appl. No. 18/529,566, Response filed Dec. 30, 2024 to Non Final Office Action mailed Oct. 8, 2024", 10 pgs.

"Chinese Application Serial No. 201980034984.6, Response to Examiner Telephone Interview filed Apr. 3, 2024", w/ English claims, 90 pgs.

"Japanese Application Serial No. 2024-125776, Notification of Reasons for Refusal mailed Aug. 5, 2025", w/ English Translation, 6 pgs.

"Chinese Application Serial No. 202410716386.X, Office Action mailed Dec. 19, 2025", w/ English translation, 14 pgs.

"Chinese Application Serial No. 202410716386.X, Office Action mailed Apr. 17, 2026", W/ English Translation, 13 pgs.

"Chinese Application Serial No. 202410716386.X, Response filed Apr. 1, 2026 to Office Action mailed Dec. 19, 2025", w/ English Claims, 22 pgs.

* cited by examiner

SYSTEMS AND METHODS FOR IMPROVING OPERATING CHARACTERISTICS OF DISPLAYS

TECHNICAL FIELD

The technical field relates generally systems and methods for liquid crystal on silicon displays.

BACKGROUND

Liquid Crystal on Silicon (LCOS) displays typically come in two types. Each type is characterized primarily by the type of circuitry under each display pixel: analog and digital.

In an analog display, the circuitry under each pixel is primarily a storage capacitor. In operation, a source of analog voltage is sequentially connected to the storage capacitor in each pixel so as to store an analog voltage in the capacitor in each pixel. These stored voltages are also connected to the pixel electrodes for the corresponding pixels.

The variable voltages on these pixel electrodes in turn determine the response of the Liquid Crystal (LC) directly above each of these pixels and thus ultimately determine (for amplitude displays) the amount of polarization change for light reflected from that pixel, or (for phase displays) the amount of phase shift applied to the light reflected from that pixel. This variable voltage is an analog quantity, so the resulting modulation of polarization or phase-shift in the LC also varies as an analog quantity.

The reproduction of gray-scale images or variable phase-shifts is straight-forward for such a display. Early developed LCOS displays were essentially all analog displays. However, analog displays become more and more difficult to build as the pixel size gets smaller. This is because very small pixels imply very small pixel capacitors. Small capacitors cannot hold an accurate charge long enough for successful display operation due to leakage currents changing the voltage over time.

Digital LCOS displays are a newer development. They incorporate digital memory internal to each pixel, which can store a “1” or “0” state. The pixel electrode can be set to one of two possible voltages, corresponding to LC-states that are fully “on” or fully “off”. These “1” or “0” states can be written to the pixel very quickly, and the voltage doesn’t change due to leakage.

Digital LCOS displays typically achieve gray-scale by writing a fast series of 1’s and 0’s to each pixel, which causes the LC to alternate between these fully-on and fully-off states. These changes happen much faster than the eye can respond. So, the eye averages the duty-cycle for these “off” and “on” conditions into an equivalent gray-scale.

In use, digital LCOS displays are typically written with “bit-planes” of 1’s and 0’s many times during each frame to achieve the required equivalent gray-scale values, using some variant of either duty-cycle modulation (DCM) or pulse-width modulation (PWM) encoding.

Digital pixel designs can be made very small and do not suffer from leakage problems. However, they tend to require more complex pixel circuits with many more transistors. And, they tend to require higher external data rates to write the large number of bit-planes per frame.

Of particular relevance to phase-mode displays, the averaging by the human eye does not work because voltage errors at the pixel correspond to positional shifts in the image which the eye cannot average out. So using digital LCOS displays for phase-mode displays is more challenging.

Phase-mode displays can send sequences of 1 & 0 bit-planes fast enough that the LC stays in an intermediate state between fully-off and fully-on corresponding to the desired phase shift. Here, the LC does not have time to fully achieve either the off or on state.

However, this approach is an approximation to the desired constant phase-shift.

And, in practice, various non-linearities in the system (particularly in the LC itself) and the minimum voltage duration cause “phase-ripple” in the LC’s response to this rapidly-changing series of bit-planes. A simulated example of a typical waveform 100 with phase-ripple 110 is shown in FIG. 1.

Here, it takes the first ~2 ms of the frame for the waveform 100 to get near the desired phase-shift value 120. Then, the phase level of the waveform 100 alternates back and forth (phase-ripple 110) nominally around the desired phase-shift value 120.

In addition, phase-mode Digital LCOS displays typically operate from a fixed Vpix equivalent power supply. A premise exists that suggests that the voltage for all bit-planes should be the same, and digital LCOS displays are designed using this assumption.

SUMMARY

The various embodiments of the present disclosure provide a drive scheme for a display that reduces phase ripple, phase switching noise, and phase instability, and that improves other operating characteristics.

Embodiments of the present disclosure utilize a drive scheme with an optimal number of and distribution of on/off bits for each gray/phase level. The sequence of binary values used to achieve a desired gray or phase value during a frame or sub frame is optimized by interspersing the desirable number of on values for that gray or phase value in that frame or sub frame with off values such that the on durations occur substantially equally spaced through the duration of the frame or sub frame.

As such, the systems and methods described herein determine an optimized sequence of “1” and “0” bit-planes that, when sent to a phase-mode bit-plane-driven digital LCOS display, results in a gray or phase-shift value with minimum phase-ripple. For example, for a 6-bit phase-mode display, the systems and methods determine optimized sequences that apply to each of the 64 possible phase-shift values defined by the 6-bit phase resolution.

Embodiments of the present disclosure utilize cyclical rotation of an optimized sequence of bits to minimize 1/0 and 0/1 transition glitches.

Embodiments of the present disclosure utilize different voltages for every bit plane.

In particular, systems and methods described herein allow individual bit-plane voltages to be fine-tuned and thereby to optimize the performance of a display to minimize phase-ripple, and thus reduce the noise of phase displays. Fine-tuning the bit plane voltage is accomplished by varying either the pixel-electrode power supply (Vpix) or by varying the cover-glass transparent electrode voltage (Vcom). Varying the Vcom voltage may introduce complications that need to be addressed. As such, fine-tuning may be by Voix adjustments only. However, it is possible to accomplish the same ends by adjustments to either Vpix, Vcom, or both.

In all of these cases, these adjustments are done by modifying the drive sequence.

Embodiments of the present disclosure may utilize: different voltages for positive and negative Vcom polarities; very high Vcom switching frequencies; synchronizing latch release to LC with actual Vcom conjugation flip; and DC balancing by using odd number of on/off bits combined with inter-frame Vcom conjugation and frame-matched on/off bits for each gray/phase level including their rotations The foregoing has broadly outlined some of the aspects and features of the various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DETAILED DESCRIPTION

Figure 1:
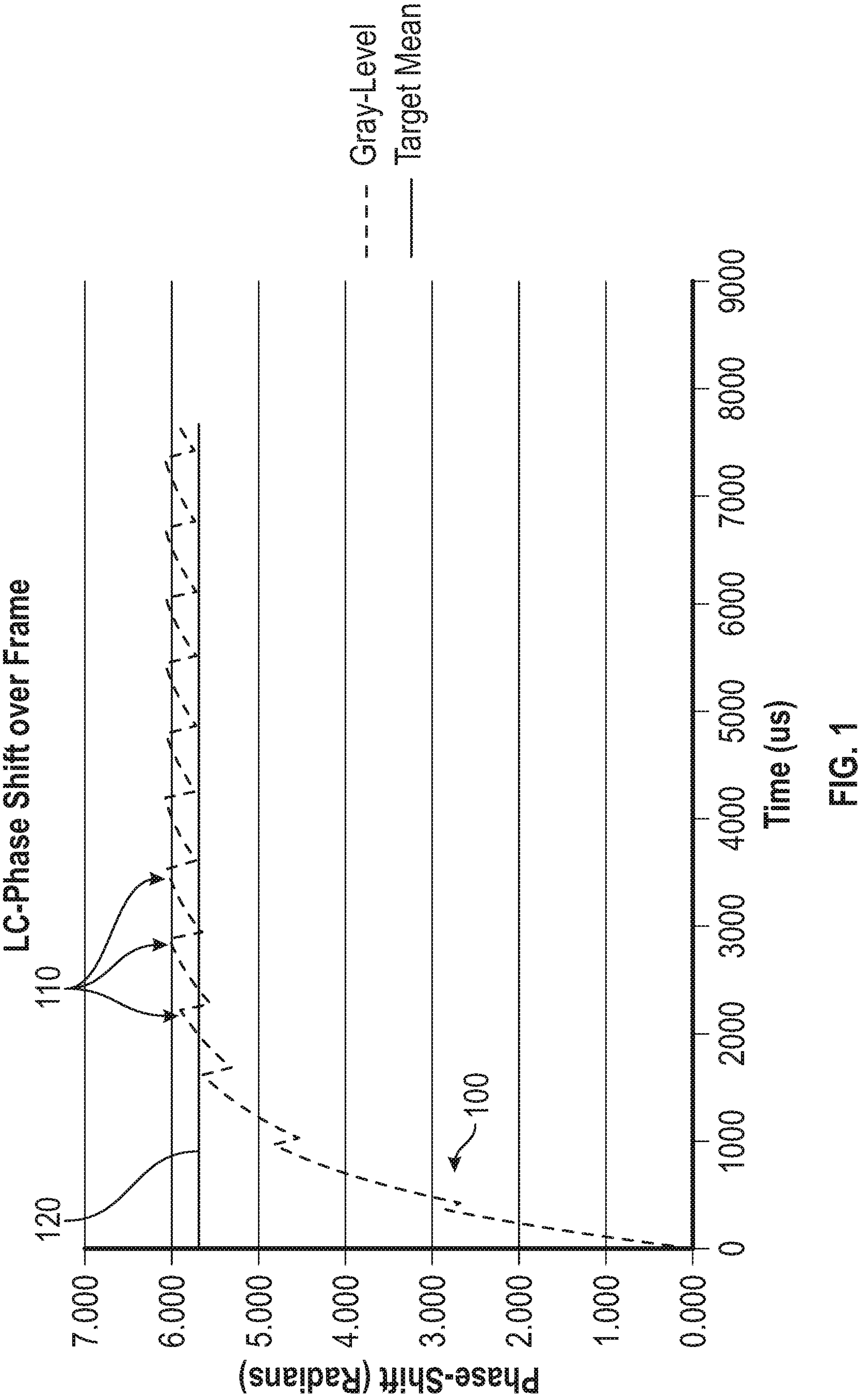
FIG. 1 is a graphical illustration of a waveform including phase ripple of the prior art.

In the following detailed description, reference is made to the accompanying drawings which form a part hereof and in which are shown, by way of illustration, embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

The descriptions may use the terms "embodiment" or "embodiments," which may each refer to one or more of the same or different embodiments. Furthermore, the terms "comprising," "comprises," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting specific design details described below.

Embodiments of the methods, processes, or techniques disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

As used in any embodiment herein, the term "logic" may refer to an application, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. As described above, the software module may include logic that is executed by processor.

The term "logic" may also refer to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from computer-executable instructions stored on a non-transitory computer-readable medium such as memory or storage, including, for example, random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip, system-on-chip (SoC), etc. In some embodiments, the circuitry may be formed, at least in part, by at least one processor executing code and/or instructions sets (e.g., software, firmware, etc.) corresponding to the functionality described herein, thus transforming a general-purpose processor into a specific-purpose processing environment to perform one or more of the operations described herein.

A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, other commercially available processors and/or other processors that are or will become available.

Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an Independent processor mat enables parallel execution of multiple threads. In addition, those of ordinary skill in the related will appreciate that a processor may be configured in what is generally referred to as 32 or 64 bit architectures, or other architectural configurations now known or that may be developed in the future, A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof.

An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include non-transitory volatile and non-volatile, removable and nonremovable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, and/or other memory storage device.

Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product.

As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are Implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote.

Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote.

In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device.

All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution.

Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". Some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future.

Also, in the same or other embodiments an internet client may include, or could be an element of, specialized software applications enabled to access remote Information via a network such as a data processing application for biological applications.

Computers or processors may be part of a network. A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also Include various intranet architectures.

Those of ordinary skill in the related arts will also appreciate that some users in networked environments may prefer to employ what are generally referred to as "firewalls" (also sometimes referred to as Packet. Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope.

Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof. It will be apparent those skilled in the art that various modifications and variation can be made in the present invention without departing from the spirit or scope of the invention. Thus, it is intended that the present invention cover the modifications and variations of this invention provided they come within the scope of the appended claims and their equivalents.

Embodiments of the operations described herein may be implemented in a computer-readable storage device having stored thereon instructions that when executed by one or more processors perform, at least in part, the methods. The processor may include, for example, a processing unit and/or programmable circuitry. The storage device may include a machine readable storage device Including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Embodiments of the present disclosure are described in the context of phase-mode operation of a digital LCoS (liquid crystal on silicon) device, but it will be clear to those skilled in the arts that, with suitable and necessary modifications, the described procedures can also be applied selectively to amplitude-mode and mixed mode LC devices, and to other kinds of LC device including for example transmissive LC devices.

Overview

In embodiments described in further detail below, a digitally-driven LCoS microdisplay operating in substantially a phase mode and using a drive scheme with one or more features as described herein that reduces phase ripple, phase switching noise, and phase instability, and increases phase accuracy and device operating-lifetime.

Figure 2:
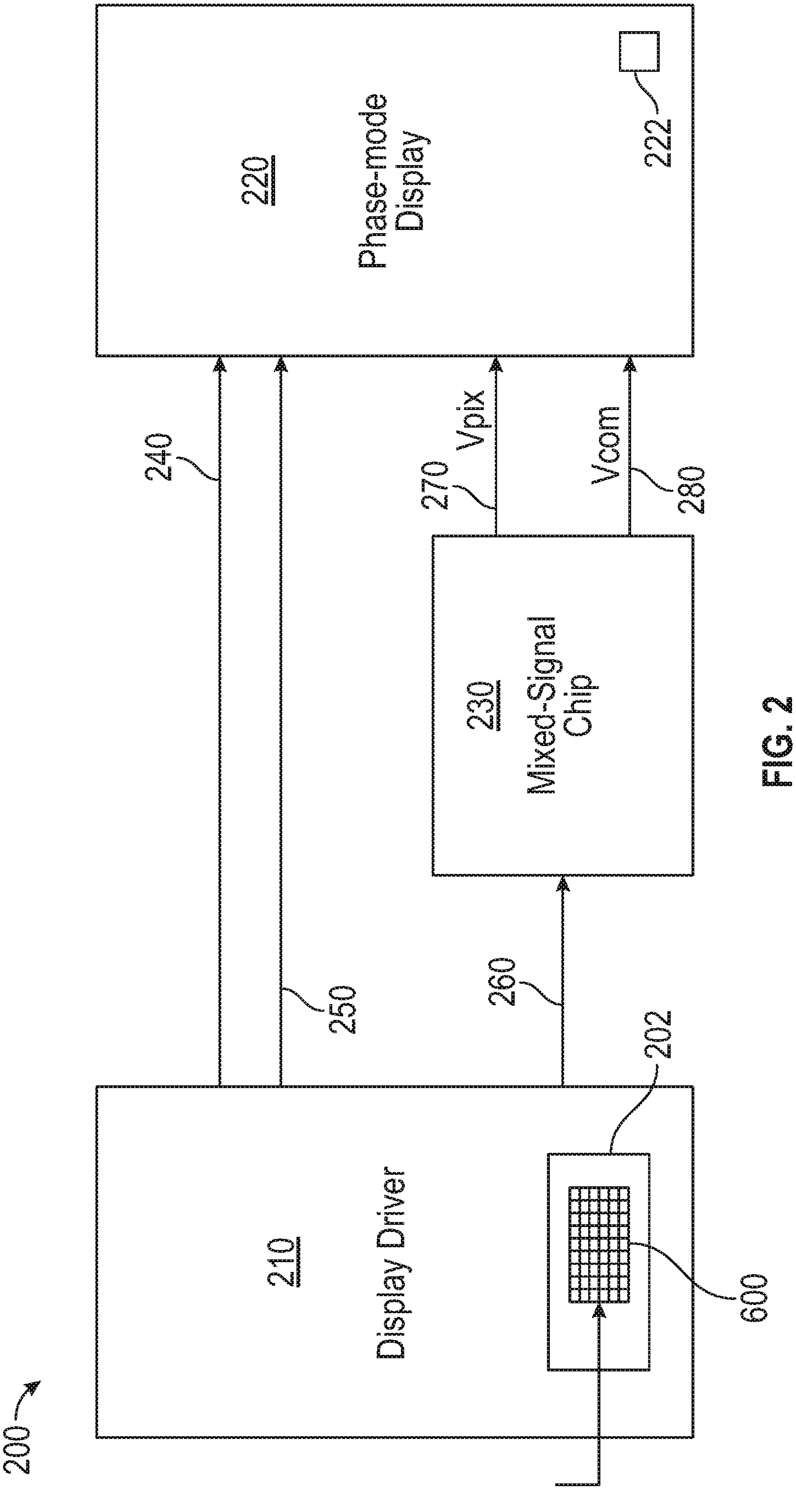
FIG. 2 is a schematic view of a display system including a display driver and a display, according to an embodiment of the present invention.

Referring to FIG. 2, certain systems and methods are described herein in the context of a Microcode drive architecture. This architecture makes use of downloaded event tables and data look-up tables (e.g., the bit-plane sequence table 600 of FIG. 6) to define all the actions that occur during a sequence of frames. The behavior of the drive algorithm can be changed by downloading a new set of tables. This is illustrated in that the same driver chip can drive a display as either an Amplitude device or as a Phase-shift device, depending on the downloaded tables used.

Display System and Methods

A high-level block diagram of a display system 200 is shown in FIG. 2. The display system 200 includes a display driver 210, a display 220, and a mixed-signal chip 230.

A bit-plane sequence table 600 (e.g., see FIG. 6) is stored in a memory 202 of the display system 200 or in a memory accessible by the system software. For example, a CPU obtains the bit plane sequence table 600 and sends them to the display driver 210 via an SPI interface.

In FIG. 2, an imager video data arrow 240 represents a connection (e.g., 64-bit DDR bus) for carrying video data from the display driver 210 to the display 220. An imager arrow 250 represents a connection (e.g., an SPI-format serial data bus) used to send configuration commands to the display 220.

The arrow 260 represents a connection (e.g., a SPI-format serial data bus) used to send control commands to the mixed-signal chip 230, which uses these commands to set the values of a Vpix output voltage 270 and a Vcom output voltage 280. The arrows for the Vpix output voltage 270 and the Vcom output voltage 280 are voltages that are connected to the display 220 to establish the "high" or full-on and "low" or fully-off voltages seen across the display pixels.

Vpix and Vcom Conjugation

In certain embodiments, the Vcom and Vpix values used in each Vcom conjugation segment are adjusted, rather than using the same values, prior to their conjugation, for each such segment, so that performance fluctuations associated with specific conjugations are reduced. For example, the voltages are adjusted during the first and last conjugations in each frame or sub-frame during which, for example, resets and latching transients may cause undesirable voltage offsets and/or excursions.

In certain embodiments, different Vcom and Vpix values are used, rather than using the same values, prior to their conjugation, in positive and negative polarity Vcom conjugation segments, to compensate for, for example, performance differences in the analog voltage circuitry for the two opposed conjugation polarities.

In certain embodiments, the Vcom switching frequency is increased to reduce, for example, current leakage during a Vcom conjugation segment, or any other time-dependent drift occurring during a Vcom conjugation segment. Leakage or drift can lead to undesirable voltage changes or fluctuations during a conjugation segment. Vcom conjugation frequencies may be sufficiently high so as to result in a Vcom conjugation for each bitplane load to the LCoS, or even several conjugations between one bitplane load and the next bitplane load.

Accurate and effective DC balance can be achieved over the duration of two or more frames or sub frames by (a) choosing an odd number of Vcom conjugations during the frame or sub frame so that inter-frame or sub frame conjugation ensures that the polarity of the final Vcom conjugation segment in a frame or sub frame is opposite to the polarity of the first Vcom conjugation segment of a matched frame or sub frame, wherein the matching of pairs is with the next frame or sub frame or with the frame or sub frame occurring an integer number of frames or sub frames later, and (b) using the same sequence of b on and off values for each of the said matched frames or sub frames, rotated by the same rotation values.

In certain embodiments, an integer number of bit plane loads per Vcom conjugation segment is used, where the integer may advantageously be as low as one, so that bit plane loads take effect at the liquid crystal within the LCoS, either directly or out of a per-pixel latch, at substantially the same moment that Vcom actually conjugates at the liquid crystal within the LCoS, allowing for designed or measured latencies between when said bit plane loads and said Vcom conjugations are sent, issued, switched, executed, or commanded by the software, firmware, and hardware of the LCoS and its driver circuitry and software and when the corresponding bit plane load and Vcom conjugations actually occur at the liquid crystal, including the designed or measured latencies and other performance characteristics of special cases such as, for example the first and/or last Vcom conjugations segments and/or the first and/or last bit plane loads of these first and/or last Vcom conjugation segments and or the first and/or last bit plane loads of other Vcom conjugation segments, substantially before, during, or after which various initializations, resets, and cache loads, for example, may be required by the driving circuitry of the LCoS and/or its associated firmware and/or software which said Initializations, resets, loads, and other operations may otherwise cause undesirable variations or fluctuations in the timing of and/or voltages present during or temporally adjacent to said bit plane loads and said Vcom conjugations.

Display Driver Process

Figure 3:
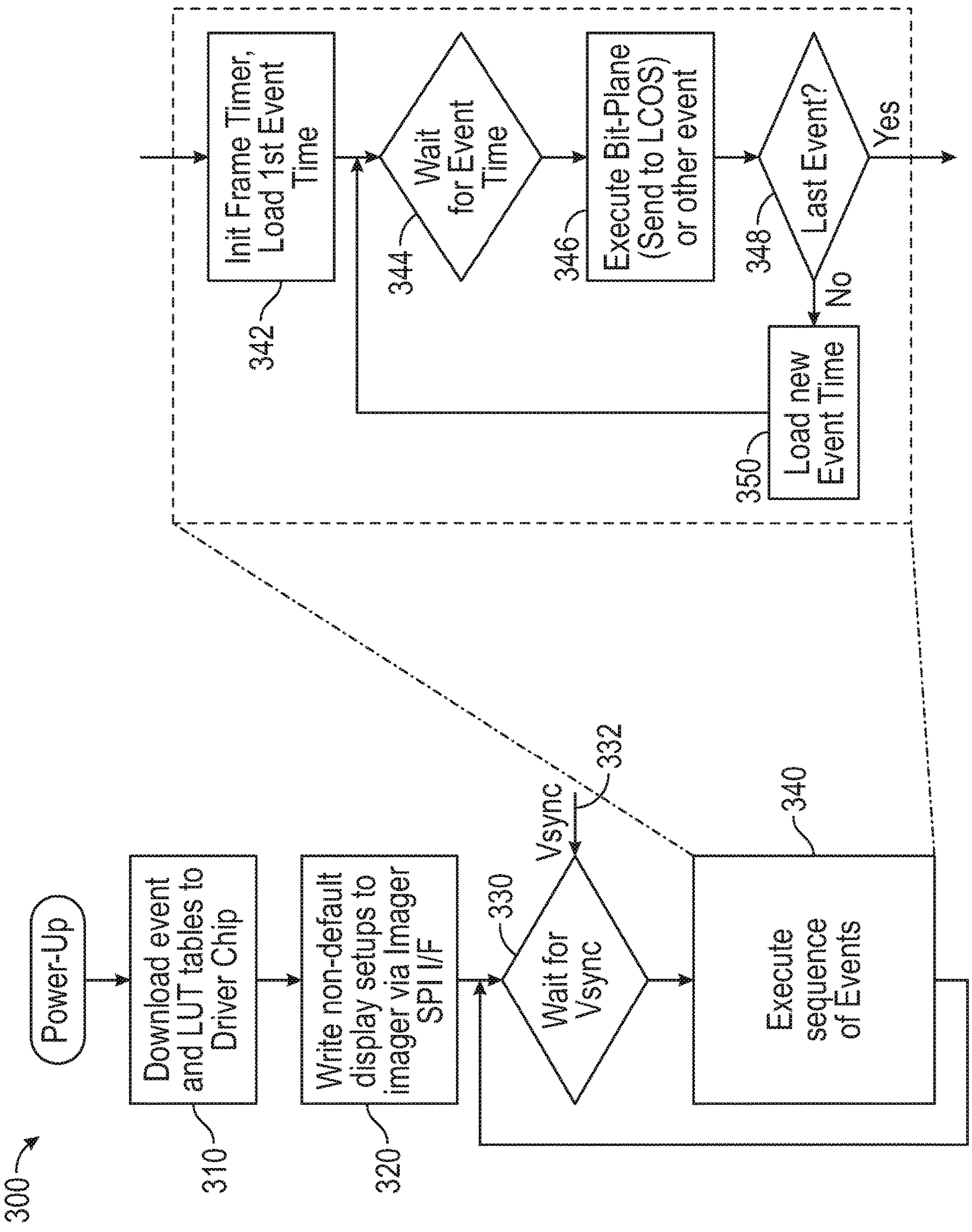
FIG. 3 is a flow chart illustrating an exemplary driver process of the display driver of FIG. 2, in accordance with the present invention.

A basic flow-chart of a drive process 300 of the display driver 210 is shown in FIG. 3. According to a first step 310, the display driver 210 downloads event table and LUT table (e.g., bit-plane sequence table 600) from memory 202. According to a second step 320, the display driver 210 writes non-default display setups to the display 220 via connection 250. According to a third step 330, the display driver 210 waits for Vsync 332 from a video source (not shown) that marks the beginning of a video frame. After receiving the Vsync 332, according to a fourth step 340, the display driver 210 executes a sequence of events according to the downloaded table.

In particular, the fourth step 340 includes initiating a frame timer and loading a first event time at a first substep 342, waiting for an event time at a second substep 344, executing a bit-plane (sending to the LCOS of the display 220) or other event at a third substep 346, determining if the event is the last event according to a fourth substep 348. If the event is not the last event, a new event time is loaded according to a substep 350 and substeps 344, 346, 348, 350 repeat until an event is determined to be a last event at fourth substep 348.

Display Process

Figure 4:
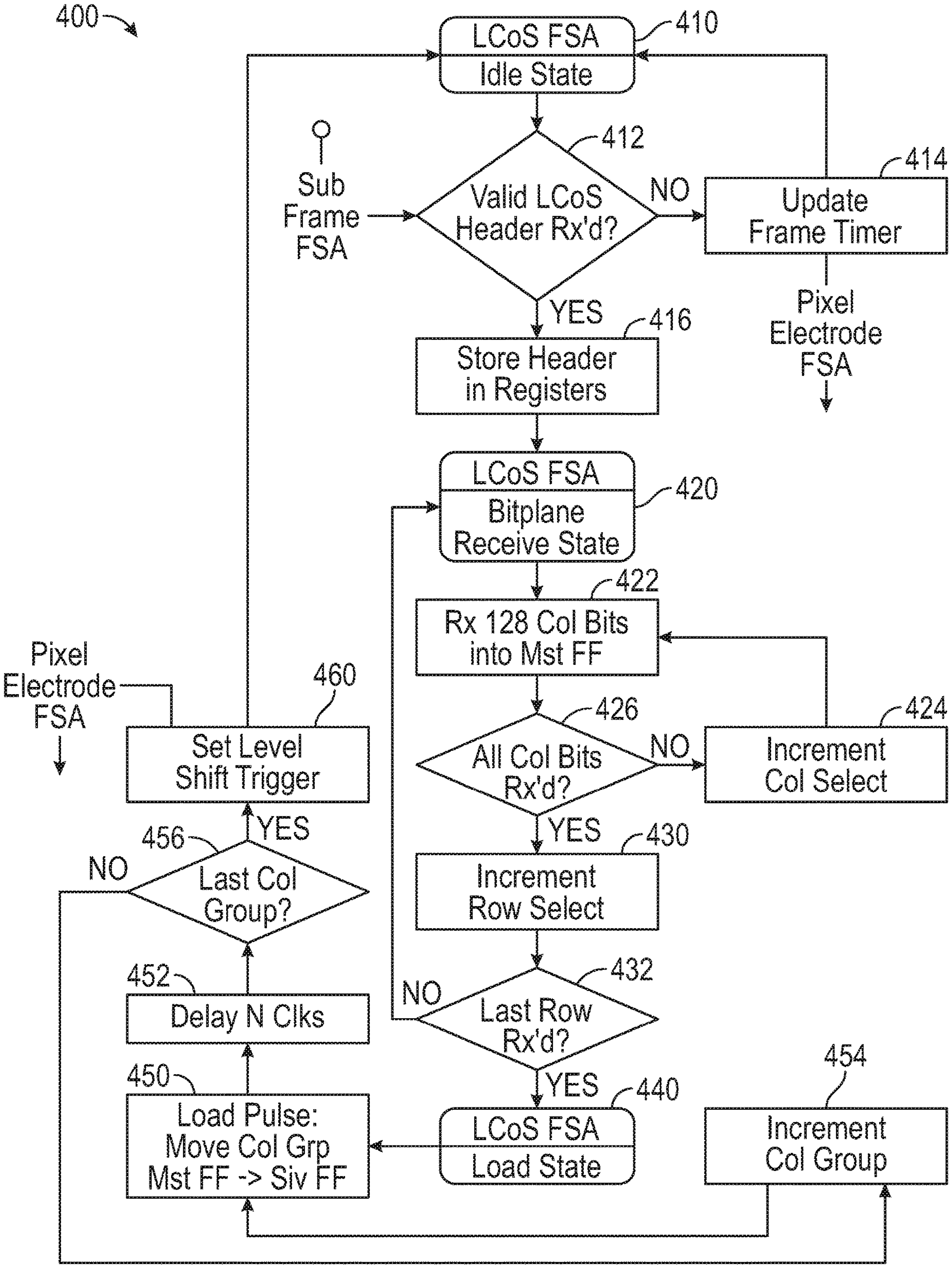
FIG. 4 is a flow chart illustrating an exemplary display process of the display of FIG. 2, in accordance with the present invention.

A basic flow-chart of a rendering process 400 on the display 220 is shown in FIG. 4. While in an idle state 410, the display 220 receives image data 240 from the display driver 210. According to a first step 412, the display 220 parses the received image data 240 over a parallel interface to determine whether a valid LCoS Header was received. If not a frame timer 414 is updated and the display 220 returns to the idle state 410. If so, the header is stored into internal registers 416 within the display 220, and the display 220 then transitions into the bit-plane receive state 420.

The display 220 receives 128 column bits over parallel interface and is stored into the appropriate pixel's master flip-flop 422. A column select counter 424 is subsequently incremented after receiving, with 422 and 424 repeating until all column data are received 426. Following column receive completion, a row select counter is incremented 430 and column select counter is zeroed prior to receiving the next row's first column data 422. The above steps are repeated until the last row and last column data are received 432, at which point the display 220 transitions into the load state 440.

While in the load state 440, the display 220 sends a load pulse to move an entire column group's master flip-flop data into a slave flip-flop 450, then delay a pre-determined number of cycles 452, then increment the column group counter 454 and repeat for all remaining column groups. After this process is repeated for all column groups 456, a level-shift trigger 460 is sent to simultaneously update all slave flip-flop data to the electrode and the display proceeds back to the idle state 410.

Bit Plane Table Method

The systems and methods described herein determine an optimized sequence of "1" and "0" bit-planes (e.g., see the bit plane sequence table 600 of FIG. 6) that, when sent to a phase-mode bit-plane-driven Digital LCOS display 220 by a display driver 210, results in a waveform 100 at a desired phase-shift value 120 with minimum phase-ripple 110.

Phase Mode and Amplitude Mode

For context, the difference between operating a digital LCOS display 220 in phase versus amplitude mode is briefly described. Typically, in amplitude mode, the display system 200 operates in PWM. Here, for a given pixel in a given frame that is to be displayed at a particular gray-level, the pixel is turned on at the beginning of the frame, and re-written with "1" values that keep it on at every bit-plane until a point in time is reached corresponding to the desired percentage of "full-scale".

So, for example, a gray-value of "0" the pixel is never turned on. For a gray-value of 50%, the pixel is typically kept on for the first half of the frame and kept turned off for the second half. For gray-values near 100%, the pixel is kept on for nearly the entire frame. So, in general, each pixel is written with a long series of "1" values at each bit-plane up to a certain point in time, and then written with a long series of "0" values from then until the end of the frame.

Figure 10:
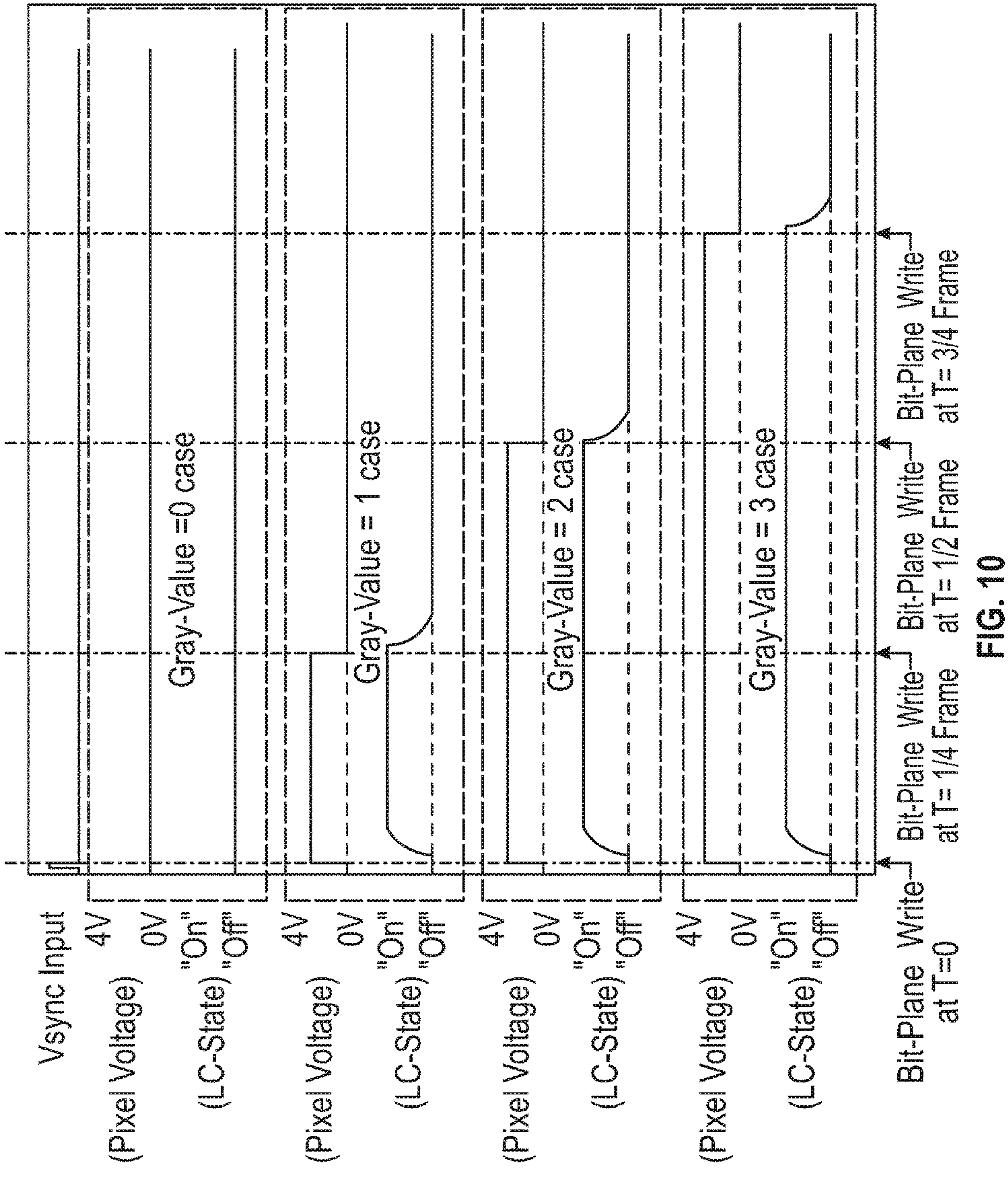
FIG. 10 is a graphical illustration of exemplary amplitude modes.

Results for various gray values are shown in FIG. 10, For these amplitude-mode cases, there are only 4 bit-plane writes corresponding to an example number of possible gray-levels ($2^2$). The Vsync pulse starts each frame off, then the pixel-voltage waveform and the corresponding LC-response. On the graph, there are 4 dashed-line boxes; one for each possible gray-values, which could represent the voltage and LC-response for 4 different pixels that need to be 4 different gray-levels. At 60 HZ, this entire sequence would take 16.67 ms to complete, and would repeat in the next frame (but in opposite polarity to get DC-balance).

Here, it should be understood that (except for a few gray-values near 0) the LC 222 of the display 220 always has time to reach the fully-on state before end of the PWM pulse, and (again except for a few gray-values near full-scale) to reach the fully-off state thereafter.

In terms of bit-plane timing (this is influenced by the desired gamma, but independent of that) the average bit-plane spacing is approximately the frame-time divided by the number of possible gray-levels. This number is usually considerably longer than the minimum possible bit-plane time and depending on the gamma value desired this spacing increases the farther Into the frame time you get.

Operation of the display system 200 in phase-mode is different. Here, the display system 200 is designed such that the LC 222 of the display 220 does not reach "fully on" or "fully off" states. Instead, the display driver 210 sends a pattern of 1's and 0's such that the LC-state of the LC 222 is jogged back-and-forth in a saw-tooth fashion keeping it at the desired percentage of "fully-on" corresponding to the desired phase-shift value 120.

Figure 11:
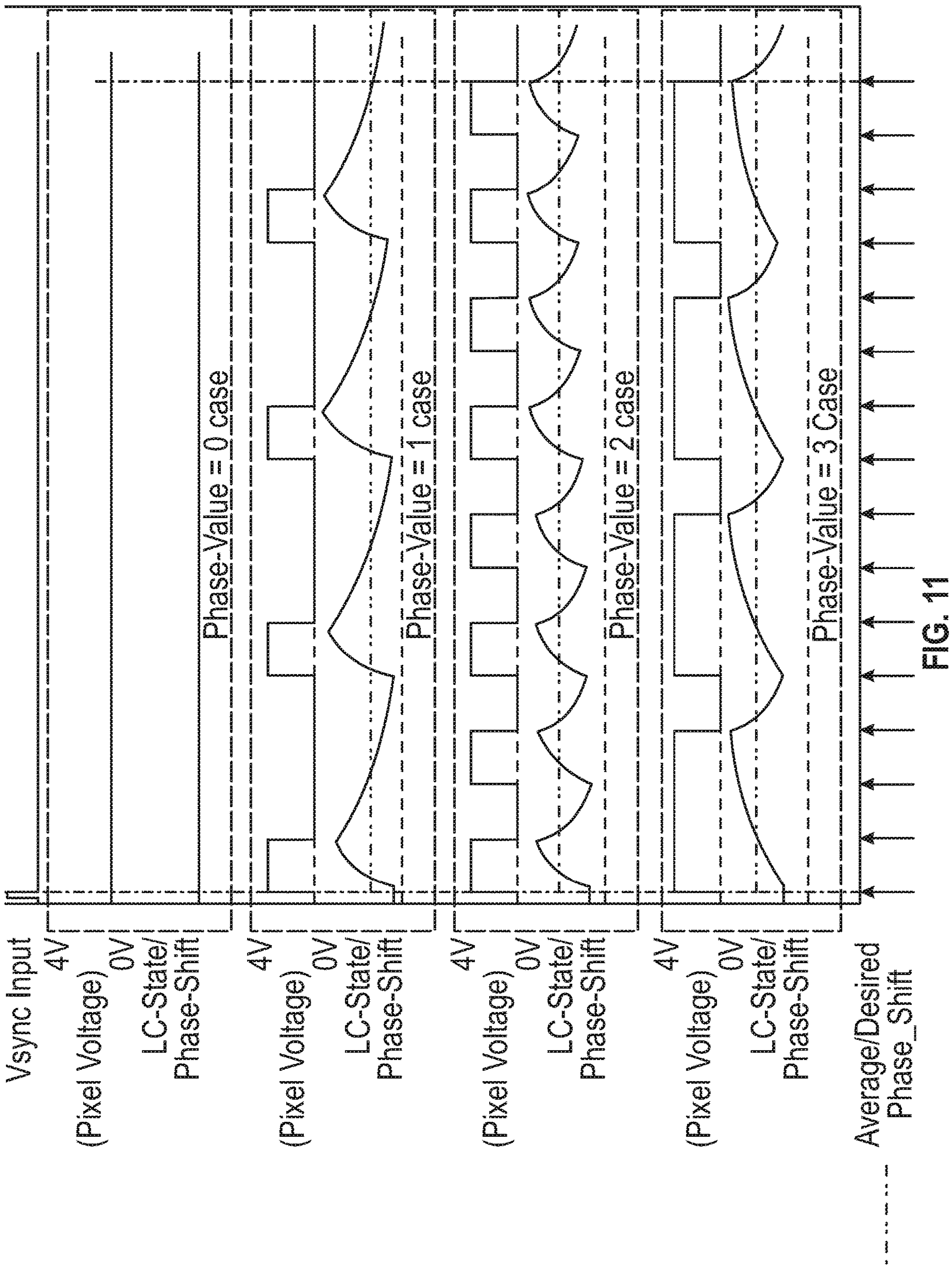
FIG. 11 is a graphical illustration of exemplary phase modes.

Results for various phase values are shown in FIG. 11. Here, there are 16 bit-plane writes and it can be understood that any time the voltage needs to change there is a bit-plane write. At 60 us between bit-plane writes, this graph only describes the first 960 us, or less than 1/16 of the frame. A dashed line shows approximately what the LC-state averages to, which is intended to be the desired phase shift.

Whenever a "1" bit-plane is sent, the LC-state begins ramping towards "fully-on" and, whenever a "0" bit-plane is sent the LC-state begins ramping towards "fully-off." The LC-state is always ramping in one direction or the other. The farther apart in time these bit-plane sends occur, the longer the ramping time in one direction, and thus the larger the amplitude of the phase-ripple 110 or sawtooth of the waveform 100.

The display system 200 writes the bit-planes 610 very close together in order to minimize the phase-ripple 110. The shortest interval between bit-plane 610 writes may be limited, for example, to about 60 us.

Depending on temperature, the rise and fall times of current materials for a phase-mode LC 222 may be around, for example, 3 ms. In this case, even fairly long sequences of the same pattern of bitplanes 610 (e.g., a series of 1's or a series of 0's) won't necessarily get the LC-state into saturation ("fully on" or "fully off").

As an example, to get an LC-state that is 60% of "fully-on," a pattern of "1" bit-planes 610 and "0" bit-planes 610 that has 60% of them "1" and 40% of them "0" could potentially achieve the desired outcome. However, the particular pattern 620 matters in order to minimize the phase-ripple 110 around a phase-shift value 120.

The selected pattern 600 applies the correct duty-cycles in order to get improved phase-shift values 120 and also minimize times where the system sends several "on" or "off" bit-planes in a row (because this tends to increase phase-ripple 110 as described above with respect to FIG. 1). A method 500 to determine an optimal pattern 600 to achieve these two objectives, among others, is now described in further detail.

Bit Plane Table Generation Method

In general, a sequence of binary values achieves a desired gray or phase value during a frame or sub frame and is determined by interspersing the desirable number of "on" values for that gray or phase value in that frame or sub frame with "off" values such that the "on" durations occur substantially equally spaced through the duration of the frame or sub frame.

We divide each frame or sub frame into $b=m\times(2^n-1)$ such on or off values, where n is the Integer native bit-depth of the frame or sub frame and m is an integer multiplier chosen such that b bitplane loads can occur substantially evenly-spaced in time during the frame or sub frame without requiring bit plane loads to occur at a higher rate than the LCoS and its driving circuitry can achieve.

Figure 5:
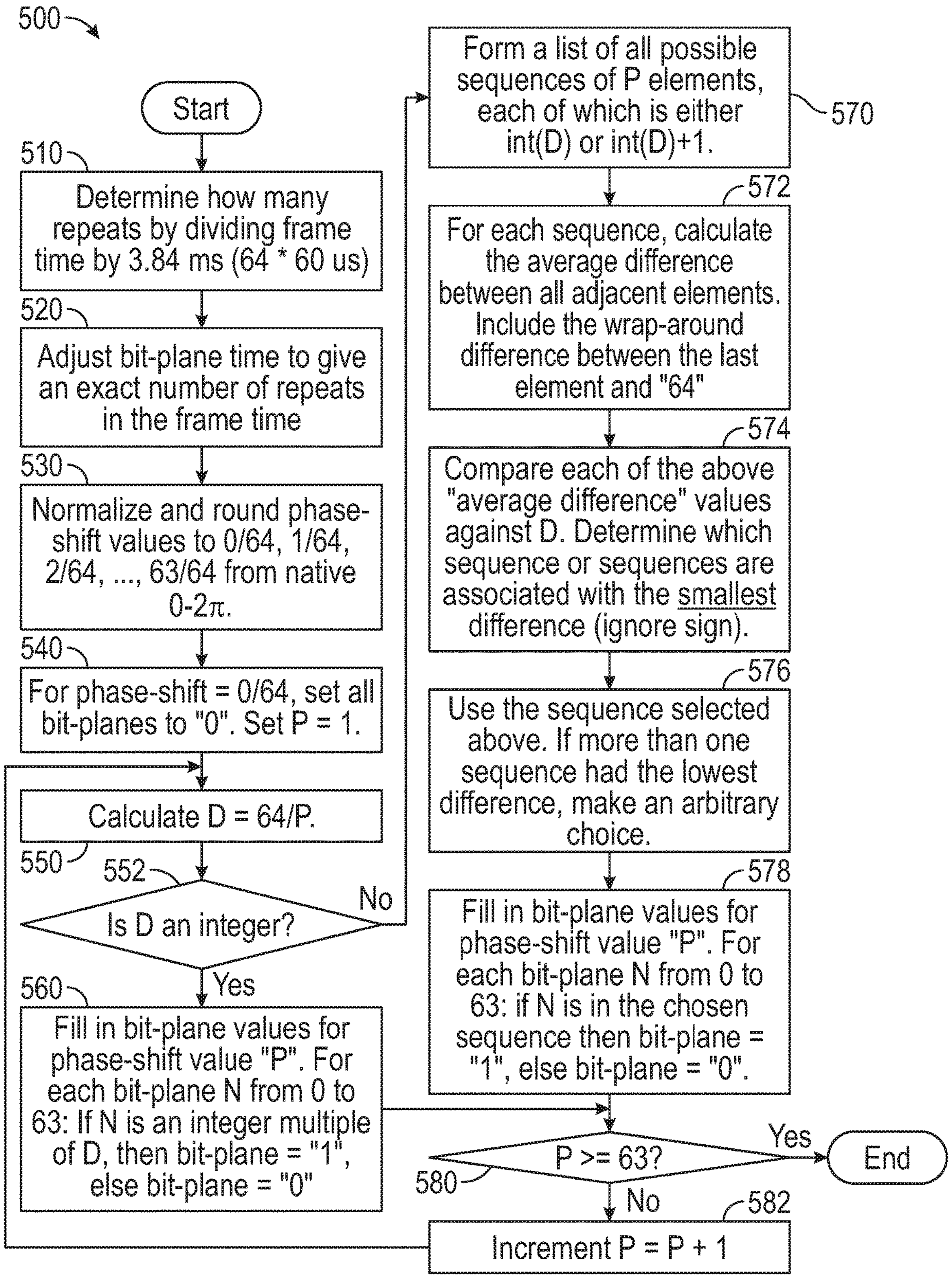
FIG. 5 is a flow chart illustrating an exemplary bit-plane generation process for generating a bit-plane sequence table, in accordance with the present invention.

The method 500 determines the pattern 600 of how many "on" or "1" bit-planes 610 (columns of table 600) there will be in a time interval according to each possible phase-shift value 620 (rows of table 600), and distributes "on" or "1" bit-planes 610 as equally as possible over the duration of that time interval. The remaining bit-plane times will then be "off" or "0" bit-planes 610. This process 500 is described below and diagramed in FIG. 5.

For example, for a 6-bit phase-mode display 220, the systems and methods 500 determine optimized sequences 620 that apply to each of the 64 possible phase-shift values 120 (phase shift value possibilities represented by rows 620 in table 600, bit planes indicated by columns 610 in table 600; each row is a sequence of bit-planes for a phase shift value) defined by the 6-bit phase resolution.

The method 500 includes a first step 510 of determining a frame-time and a number of bits of phase-shift resolution. For example, a 60 Hz frame has a frame time of 16.667 ms in duration. Various phase-shift resolution is contemplated. As an example, If 6-bits of phase-shift resolution is selected, there is 64 ($2^6$) bits 610 of phase-shift resolution in a basic modulation sequence and the patterns 600 are determined to support the possibilities 620 from 0 out of 64 through 63 out of 64 being "1".

Continuing with this example, a minimum modulation time is 64*60 us=3.84 ms. According to a second step 520, the number of times the 64 bit-plane sequence (modulation time) repeats within the frame is determined. Here, the frame time is 16.667 ms long, so there is time for 4.34 repetitions of this 64 bit-plane sequence.

The time of each bit-plane 610 is then adjusted to so that the number of repetitions is an integer. For example, the bit-plane 610 time is adjusted to 65.1 us to have exactly 4 repetitions of the 64 bit-plane sequence (modulation pattern) within the time frame.

The method 500 continues with series of substeps for selecting a bit-pattern 620 for each of the 64 possible phase-shift values.

According to a third step 530, phase-shift values are normalized and rounded to 0/64, 1/64, 2/64, 3/64, . . . 63/64 from native 0-2π phase-shift values 120. In each case, the numerator (P) is the number of "on" or "1" bit-planes out of the 64 possible. It should be understood that each of these fractions can be converted back to a phase-shift value (in radians) if desired by multiplying by 2π.

According to a fourth step 540, for a phase shift of 0, all the 64 bit-planes are "0". P is set to start at a value of 1.

According to a fifth step 550, the average "on" bit-plane spacing (D) is determined by dividing 64 by the numerator value (P). For example, for the phase-shift corresponding to 8/64 (0.785 radians), 64 is divided by 8 to get the result 8.0. This means that every $8^{th}$ bit plane will need to be an "on" bit-plane.

According to a substep 552 of fifth step 550, for each of the D values and associated P values, it is determined if D is an integer.

According to a sixth step 560, for phase-shift values where this division comes out even (D produces an integer result), the pattern 620 is determined. In this pattern 620, the "on" or "1" bit-planes are 0 (the first), 8, 16, 24, 32, 40, 48, and 56. For a phase-shift of 2π (full-scale), all the 64 bit-planes are "1". And for a phase-shift of 1π (mid-scale) the pattern is alternating 1's and 0's (32 of each) as "10101010 . . . ".

However, for most of the phase-shift values (associated with a numerator P) the division of step 550 does not produce an integer result at step 552. For example, for the phase-shift corresponding to 3/64 (0.295 radians), the division result is 64/3=21.3. This would correspond to an "on" bit-plane every 21.3 bit-planes. However, "on" bit-planes cannot have a fractional or non-integer location in the table 600. Instead, the non-fractional position of the three "on" bit-planes is determined to be as uniform as possible, according to a series of substeps 570, 572, 574, 576, 578, so that the average spacing between "on" bit-planes 610 is as close as possible to 21.3.

In general, for each non-integer spacing, the system enumerates the patterns closest to the desired spacing, calculates the average spacings for each pattern, and eliminates all but the pattern(s) with the average spacing closest to the desired average spacing. If there are more than one pattern with the same closest average spacing (as in the above example), the system selects the one with the earliest "extra" on-bit-plane(s).

Here, according the substep 570, for each non-integer D value, the system determines spacings are int(D) or int(D)+1. For the example above, the spacings will each be either 21 or 22 (int(21.3) or int(21.3)+1).

According to the substep 570, the system additionally forms a list of all possible sequences (associated with a numerator P). As an example, if each repetition begins at 0 with an "on" bit-plane, the choices continuing the above example are {0, 21, 42}, {0, 21, 43}, {0, 22, 43}, or {0, 22, 44}.

According to the substep 572, for each sequence, the system calculates the average difference between the adjacent elements. This includes the "wrap-around" difference between the last element and "64". For the example sequences, the average spacing of each series is respectively: 21.3, 21.3, 21.3, and 21.7.

According to the substep 574, the system compares each of the average spacings to the value of D and determines which sequence or sequences are associated with the smallest difference. Continuing the above example, of the average spacings calculated, the last is eliminated because the average spacing is farthest from the target of 21.3. The choices {0, 21, 42}, {0, 21, 43} and {0, 22, 43} remain and any of these is a valid choice.

According to a substep 576, the system uses the determined sequence or selects from the remaining sequences. For example, selecting from the remaining example sequences, the second choice {0, 21, 42} is selected because it puts an "on" bit-plane earlier in the frame where it will speed-up the process of getting to the desired phase-value a little earlier.

According to a substep 578, at each phase shift value (P), the bit plane table 600 is filled with bit-plane values according to the selected sequence. The sequence indicates the bit-planes 610 that have "on" values for a given P value.

According to substeps 580, 582, the steps of the process 500 repeat for additional values.

Figure 6:
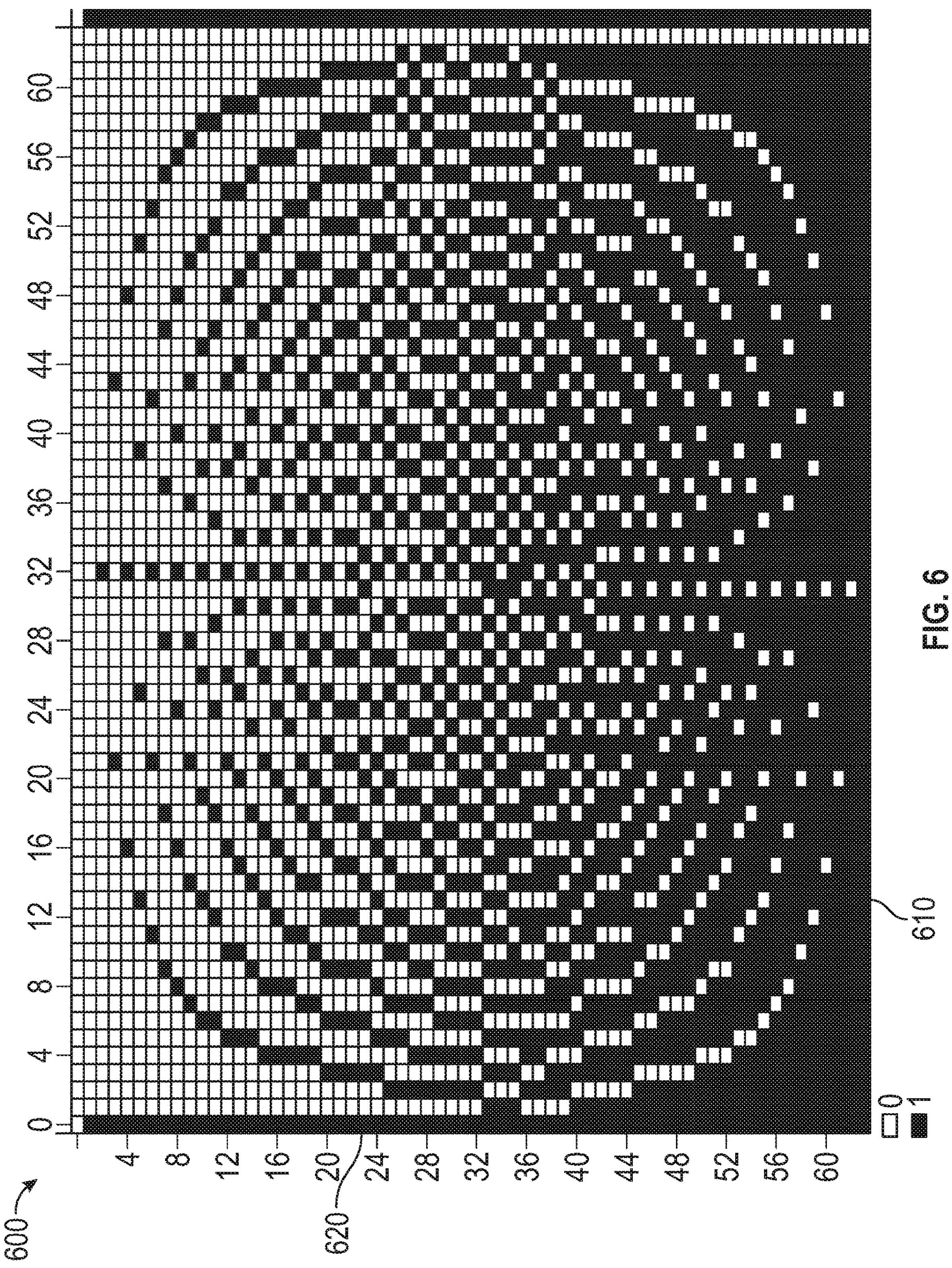
FIG. 6 is a graphical illustration of an exemplary bit-plane sequence table generated according to the bit-plane sequence process of FIG. 5, in accordance with the present invention.

FIG. 6 shows a graphic that illustrates an example of which bit-planes would be "on" for each of the possible 64 phase-shift-levels in an exemplary 6-bit system described above, Note each row is a different phase-shift; green cells are "on" bit-planes.

Cyclically Rotate

As described above, each frame or sub frame is divided into b=m×($2^n$−1) such "on" or "off" values, where n is the integer native bit-depth of the frame or sub frame and m is an Integer multiplier chosen such that b bitplane loads can occur substantially evenly-spaced in time during the frame or sub frame without requiring bit plane loads to occur at a higher rate than the LCoS and its driving circuitry can achieve.

For each desired gray or phase value, the system cyclically rotates the sequence of b on and off values for that gray or phase value by an integer value. For example, the system selects a set of integer rotation values, one per phase or gray value, which collectively result in substantially equal numbers of on-to-off transitions in each of the b bit plane loads and substantially equal numbers of off-to-on transitions in each of the b bit plane loads. As such, the rate of on-to-off and the rate of off-to-on transitions is kept substantially constant within the frame or sub frame.

As another example, the system selects a set of integer rotation values which are chosen from the set of possible unique rotation values (there are only m=$2^n$×b unique choices of b rotation values which result in different sequences of b on and off values). The selection is determined either by numerically evaluating some or all m of the possible sets to minimize or maximize one or more numerically defined merit functions.

For example, the selection may be determined with respect to the uniformity of temporal distribution of on-to-off transitions. Or, the selection may be determined to prevent the occurrence of a substantial number of off-to-on transitions at or close to certain moments in the frame or sub frame such as, for example, the start or end of the frame or sub frame.

Or, the selection may be determined experimentally by measuring one or more merit functions of the LCoS with some or all m of the possible sets, one at a time. Here, the measured merit function may, for example, be the diffraction efficiency of the LCoS operating with that set of rotation values. As another example, the merit function may be the ratio between the optical power measured in a first substantially-bright region of the first-order diffracted image produced by the LCoS operating with that set of rotation values and the optical power measured in a second substantially-dark region of the first-order diffracted image produced by the LCoS operating with that set of rotation values; or measured in the spatially corresponding region of the conjugate of the first-order diffracted image.

Additionally, the selection may be determined by a hybrid method wherein candidate sets are selected numerically from the possible sets and these candidates are then evaluated experimentally.

In practice, each bit-plane sets the value of every pixel in the display at the same time and the essentially simultaneous transition of millions of pixels can result in system level Interactions. If bit sequences are considered as depicted in FIG. 6, the number of phase-shift values for which the pixel is changing state (from 0 to 1 or from 1 to 0) between one bit-plane and the next can be as few as 20 or as many as 41. With an image containing a broad range of phase-shift values being applied to an imager containing millions of pixels, the varying activity level as bit-planes are executed over the course of the frame create visible artifacts.

The series of pixel 1 and 0 states over the course of the framework achieve a target phase-shift through their mix and spread of 1's and 0's. They are not dependent on starting the sequence of 1's and 0's at any particular point in the sequence. Accordingly, the system performs an optimization step that calculates the number of pixel state changes between each bit-plane and adjusts the starting point for each series of 1's and 0's associated with each target phase-state value to minimize the range between the calculated minimum number of pixel state changes between consecutive bit-planes and the calculated maximum number of pixel state changes between consecutive bit-planes. Applying this optimization greatly reduces the artifacts and improves phase contrast.

Variable Voltage Per Bitplane

Figure 8:
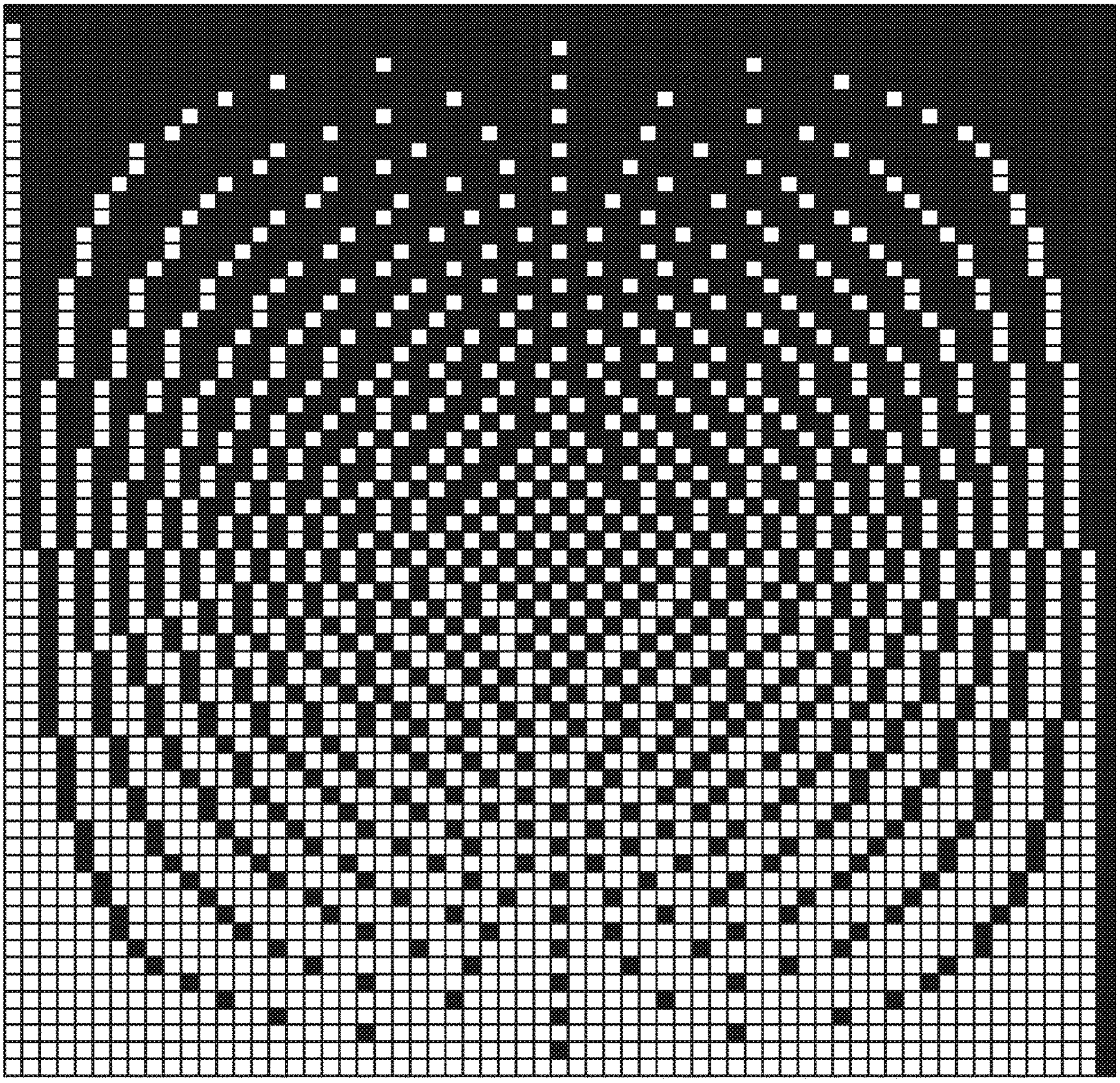
FIG. 8 is a graphical illustration of an exemplary baseline bit-plane sequence table.
Figure 9:
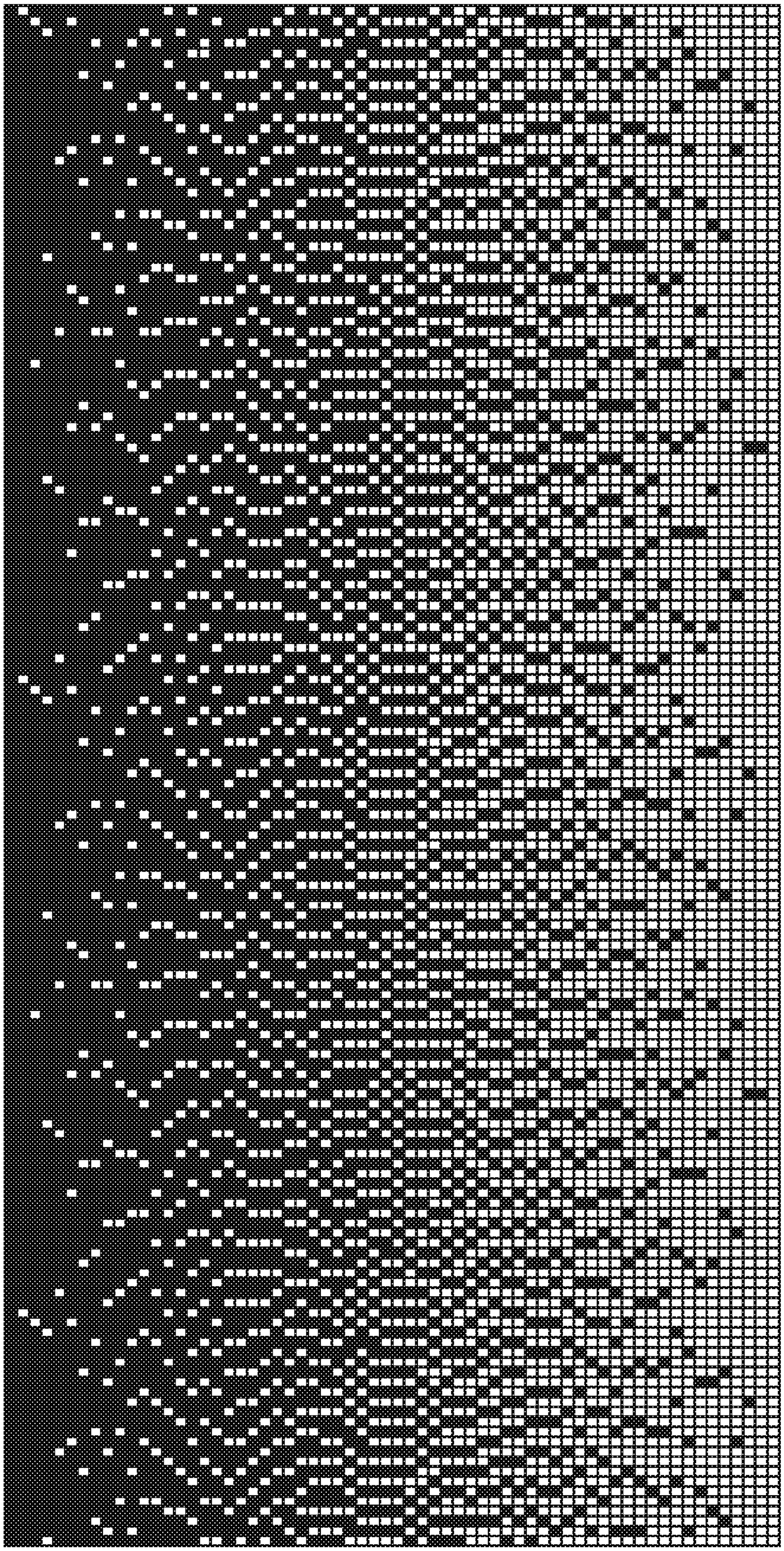
FIG. 9 is a graphical illustration of an exemplary modified bit-plane sequence table.

FIG. 8 is an exemplary baseline bit-plane sequence table 800 and FIG. 9 is a modified bit-plane sequence tables 900, 1000 (the set of bit planes that result from applying the optimization below to the baseline set of bit-planes 800 depicted in FIG. 8).

Referring again to FIG. 2, a Microcode drive architecture of the display system 200 can change details of a bit-plane sent to the display 220 independent of other bit-planes. One of these details is the voltage that is applied to the pixel electrodes for the given bit-plane. This voltage (the display voltage Vpix 270) is in this example embodiment supplied to the display 220 from an external mixed-signal chip 230, with the actual voltage being set by a SPI-Interface write 250 from the display driver 210 to the mixed-signal chip 230.

This SPI-Interface write 250 is initiated and the value written is determined by a command that has been inserted or presented into the downloaded event table. Thus, by downloading a new event table, it's possible to make individual adjustments in the Vpix voltage 270 used for each bit-plane.

According to a voltage adjustment method 700, small empirical voltage adjustments are made to each bit-plane in succession, usually starting with the first bit-planes sent, and phase ripple 110 measurements are made after each adjustment.

Small voltage adjustments, typically of only 0.1 or 0.2V, for example, applied to only one or two of the bit-planes in a frame (or sequence/row), can be very effective in reducing the average amount of phase ripple 110. In particular, making these voltage adjustments particularly to either the first bit-plane in a frame or the last bit-plane in a frame (or both) is most effective.

This effect is most easily be understood as partially "correcting" or "compensating" for asymmetries caused by the periods of inactivity that precede and follow the sequence of bit-planes that occur during the course of the frame. These adjustments should be made in such a way that overall DC-balance is still maintained for the display 220 over the course of continuing operation since any residual DC voltage present on a LCOS display 220 can lead to flicker and image sticking artifacts.

Figure 7:
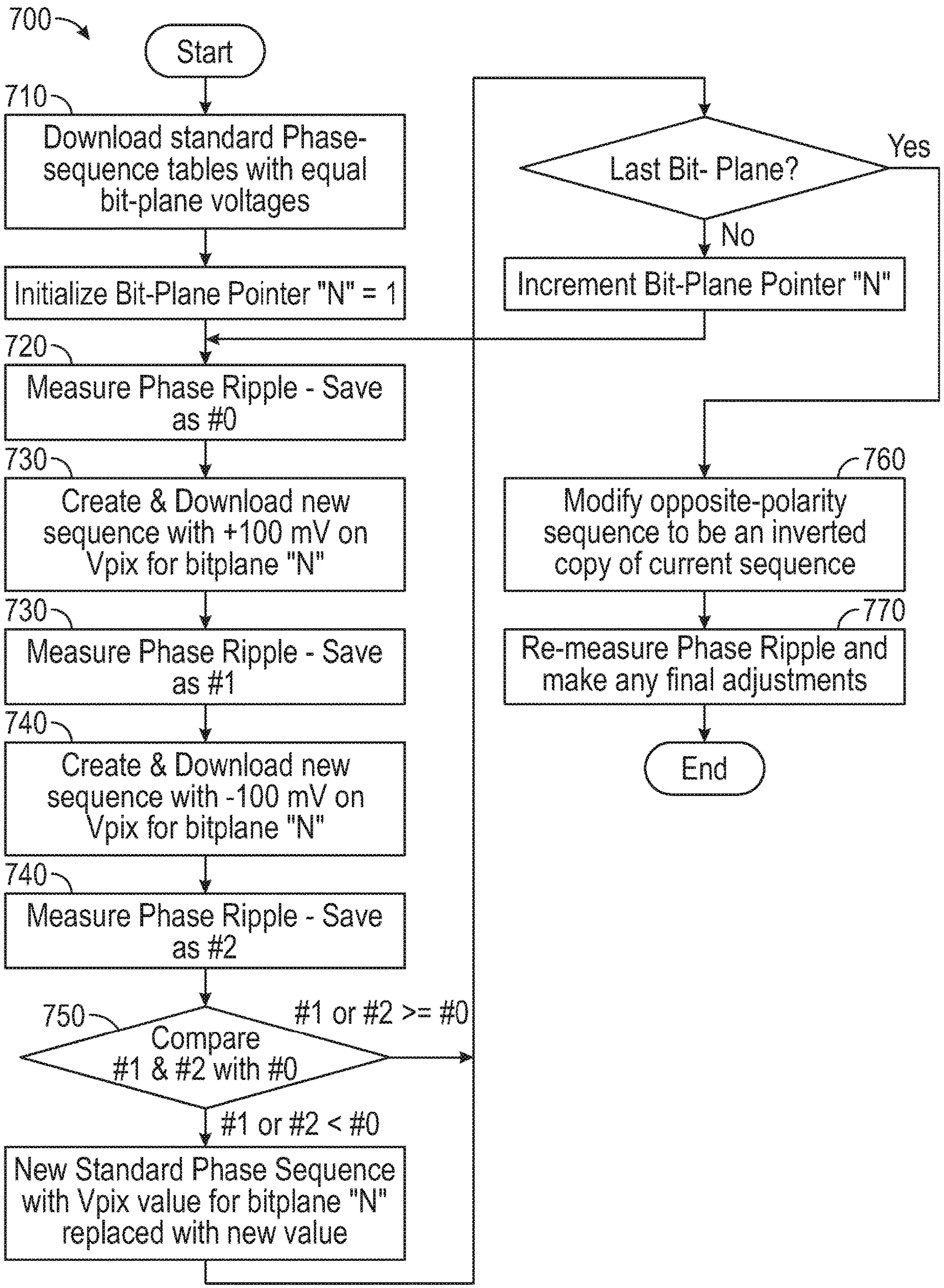
FIG. 7 is a flow chart illustrating an exemplary bit-plane voltage adjustment method, in accordance with the present invention.

Referring to FIG. 7, the exemplary voltage adjustment method 700 is now described in further detail. According to a first step 710, a baseline phase-mode sequence table 800 is downloaded to the display driver 210. The phase-mode sequence table 800 has bit-plane Vpix voltages 270 set to a baseline value.

According to a second step 720, the display system 200 measures the phase-ripple 110 using this baseline sequence table 800 and saves the results as a baseline (#0) for this bit-plane.

According to a third step 730, the display system 200 modifies the baseline sequence table 800 to apply a +100 mV Vpix offset (relative to the "baseline" value) for the first bit-plane only. The modified phase-mode sequence table is downloaded to the display driver 210, the display system 200 measures the phase-ripple 110 using this new sequence, and saves the results as (#1).

According to a fourth step 740, the display system 200 modifies the baseline sequence table 800 to apply a −100 mV Vpix offset (relative to the "baseline" value) for the first bit-plane only. The modified phase-mode sequence table is downloaded to the display driver 210, the display system 200 measures the phase-ripple 110 using this new sequence, and saves the results as (#2).

According to a fifth step 750, the display system 200 compares the phase-ripple 110 of result #0 to the phase-ripple 110 of results #1 and #2. If either #1 or #2 has lower phase-ripple than #0, replace the baseline Vpix voltage 270 in the baseline sequence with this first bit-plane with the modified Vpix voltage (Vpix voltage 270 and Vpix offset) that gave the smaller phase-ripple 110 value.

The steps 710, 720, 730, 740, 750 are repeated for each bit-plane in the sequence. In each case, if a voltage offset for the Vpix voltage 270 for a particular bit-plane is found to give a lower phase-ripple 110 value than the previous "low" phase-ripple 110 value, the Vpix voltage 270 value is replaced in the baseline sequence for that bit-plane with the value that resulted in a lower overall phase ripple 110. This new "modified sequence" is then used for the remaining steps.

These values can interact, so it may be advantageous to repeat the steps more than once for each bitplane 610 in the sequence 620. It may also be advantageous to repeat the algorithm with voltage offsets smaller than 100 mV to fine-tune the final result. Other offsets are contemplated.

According to a sixth step 760, the display system 200 makes changes to the opposite-polarity sub-frame and re-checks the phase-ripple 110 over the combined positive and negative sub-frames. The changes to the positive and negative sub-frames are of equal magnitude and opposite polarity to ensure that DC-balance is maintained. It may be advantageous to repeat the process 700 over these combined sub-frames to further minimize the phase ripple 110.

According to a seventh step 770, the display system 200 saves and stores the final modified "baseline" sequence 900, 1000 that incorporates Voix offsets.

The process 700 is part of the engineering optimization for a particular drive sequence and LC-construction.

Conclusion

Analog designs have historically been favored because it's been thought that digital designs cannot produce the accurate low-phase-ripple phase-shifts needed for Holography. However, digital phase-mode LCOS displays are arguably at least competitive, and often superior, to Analog designs in a number of respects. Digital phase-mode LCOS displays are capable of phase-ripple that is competitive with Analog versions-typically 3% or less for 6-bit resolution. Digital phase-mode LCOS displays have less to no of each of "droop" and inaccurate charge-transfer, which are problems for Analog displays-especially at smaller pixel sizes. Because digital phase-mode LCOS displays don't require a minimum size to fit a storage capacitor in each pixel, they are capable of implementations in much smaller pixels. For example, digital phase-mode LCOS displays may use a pixel pitch of 3.015 um, and smaller pixels are possible. No Analog phase-mode displays have been demonstrated with pixels this small.

The digital architecture gives much improved immunity to noise, offset-voltage, ground-bounce, PSRR issues, and other artifacts that make Analog LCOS displays challenging to design with.

The systems and methods allows display of phase images that are of higher contrast than those created by prior-art displays. By providing a method of operating the display with reduced phase-ripple, contrast is improved. This makes displays created using the systems and methods described herein better (because they produce higher-quality images) and more suitable for use by end customers.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The above-described embodiments are merely exemplary illustrations of implementations that are set forth for a clear understanding of principles. Variations, modifications, and combinations may be made to the above-described embodiments may be made without departing from the scope of the claims. All such variations, modifications, and combinations are included herein by the scope of this disclosure and the following claims.

The invention claimed is:

1. A display system, comprising:

a display comprising a plurality of pixels; and a display driver to:

store a plurality of bit-plane sequences, each bit-plane sequence comprising baseline voltage values for a plurality of bit-planes;

measure a first phase ripple value of the display using the baseline voltage values;

generate a modified bit-plane sequence by adding a voltage offset to at least one baseline voltage value of at least one bit-plane of the plurality of bit-planes of a first bit-plane sequence of the plurality of bit-plane sequences;

measure a second phase ripple value of the display using the modified bit-plane sequence; and select between the first bit-plane sequence and the modified bit-plane sequence based on comparing the first and second phase ripple values.

2. The display system of claim 1, wherein:

the display driver maintains DC-balance by applying equal and opposite voltage offsets to corresponding bit-planes in positive and negative polarity sub-frames.

3. The display system of claim 1, further comprising:

a mixed-signal chip coupled to the display driver to:

receive voltage control commands from the display driver; and generate pixel electrode voltages for the display according to the voltage values of the selected first bit-plane sequence or modified bit-plane sequence.

4. The display system of claim 1, wherein:

the voltage offset is between 0.1V and 0.2V.

5. The display system of claim 1, wherein:

each bit-plane sequence includes one or more groups of 1-values spaced apart from one another within the bit-plane sequence by one or more groups of 0-values.

6. The display system of claim 5, wherein:

each of the one or more groups of 1-values has a respective number of bit-planes that is within one bit-plane of the respective number of bit-planes of each other group of 1-values.

7. The display system of claim 6, wherein:

each of the one or more groups of 0-values has a respective number of bit-planes that is within one bit-plane of the respective number of bit-planes of each other group of 0-values.

8. The display system of claim 7, wherein:

for each sequence of bit-planes where:

a length of the bit-plane sequence is a first length;

a number P represents the number of 1-values in the bit-plane sequence; and the number P of 1-values is greater than one and less than the first length minus 2, the number of 1-values being distributed across a length of the bit-plane sequence according to a spacing D that is determined as the first length divided by P.

9. The display system of claim 1, wherein:

the display driver is further configured to apply the selected bit-plane sequence or modified selected bit-plane sequence to a pixel of the plurality of pixels.

10. The display system of claim 9, wherein:

the display driver is further configured to select the bit-plane sequence from the plurality of bit-plane sequences based on a phase-shift value of the pixel.

11. The display system of claim 10, wherein:

the display driver stores the plurality of bit-plane sequences in a display table including a plurality of rows, each row of the display table including a corresponding bit-plane sequence of the plurality of bit-plane sequences, each row associated with one of a plurality of phase-shift values for each of the pixels in the display.

12. The display system of claim 1, wherein:

the display driver applies the bit-plane sequences to the display during a frame having an associated frame time; and each bit-plane in a bit-plane sequence corresponds to a respective time period such that the bit-plane sequence repeats an integer number of times within the frame time.

13. A display driver, comprising:

storage means to store a plurality of bit-plane sequences, each bit-plane sequence comprising baseline voltage values for a plurality of bit-planes;

first measurement means to measure a first phase ripple value of a display using the baseline voltage values;

bit-plane modification means to generate a modified bit-plane sequence by adding a voltage offset to at least one baseline voltage value of at least one bit-plane of the plurality of bit-planes of a first bit-plane sequence of the plurality of bit-plane sequences;

second measurement means to measure a second phase ripple value of the display using the modified bit-plane sequence; and selection means to select between the first bit-plane sequence and the modified bit-plane sequence based on comparing the first and second phase ripple values.

14. A method, comprising:

storing a plurality of bit-plane sequences, each bit-plane sequence comprising baseline voltage values for a plurality of bit-planes;

measuring a first phase ripple value of a display using the baseline voltage values;

generating a modified bit-plane sequence by adding a voltage offset to at least one baseline voltage value of at least one bit-plane of the plurality of bit-planes of a first bit-plane sequence of the plurality of bit-plane sequences;

measuring a second phase ripple value of the display using the modified bit-plane sequence; and selecting between the first bit-plane sequence and the modified bit-plane sequence based on comparing the first and second phase ripple values.

15. The method of claim 14, wherein:

DC-balance is maintained by applying equal and opposite voltage offsets to corresponding bit-planes in positive and negative polarity sub-frames.

16. The method of claim 14, further comprising:

receiving voltage control commands; and generating pixel electrode voltages for the display according to the voltage values of the selected first bit-plane sequence or modified bit-plane sequence.

17. The method of claim 14, wherein:

the voltage offset is between 0.1V and 0.2V.

18. The method of claim 14, wherein:

each bit-plane sequence includes one or more groups of 1-values spaced apart from one another within the bit-plane sequence by one or more groups of 0-values.

19. The method of claim 18, wherein:

each of the one or more groups of 1-values has a respective number of bit-planes that is within one bit-plane of the respective number of bit-planes of each other group of 1-values.

20. The method of claim 19, wherein:

each of the one or more groups of 0-values has a respective number of bit-planes that is within one bit-plane of the respective number of bit-planes of each other group of 0-values.

* * * * *